D. B. Baker.
Clutches for Operating Horse Hay-Forks.
N° 72778.      Patented Dec. 31, 1867.

Witnesses:
F. Lehmann
Jno. A. Ellis

Inventor:
D. B. Baker
per J. H. Alexander & Co.
atty

United States Patent Office.

D. B. BAKER, OF ROLLERSVILLE, OHIO.

Letters Patent No. 72,778, dated December 31, 1867.

---

IMPROVEMENT IN CLUTCHES FOR OPERATING HORSE HAY-FORKS.

---

The Schedule referred to in these Letters Patent and making part of the same.

---

TO ALL WHOM IT MAY CONCERN:

Be it known that I, D. B. BAKER, of Rollersville, county of Sandusky, and State of Ohio, have invented certain new and useful Improvements in Automatic Adjusting-Clutches; and I declare the following to be a full, true, and exact description of the same, reference being had to the accompanying drawings, and to the letters of reference marked thereon.

The object of this invention is to construct an automatic adjusting-clutch, which shall be perfectly simple in its construction, and effective in its operation, by means of which horse hay-forks and other heavy weights may be more easily and advantageously operated.

Figure 1:
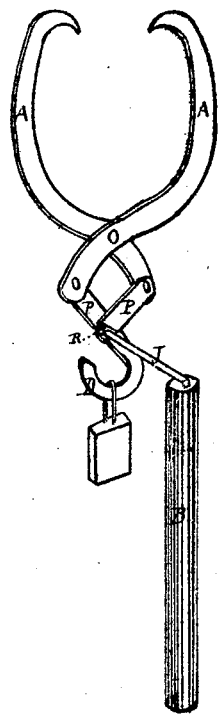
Figure 1 is a perspective view of my invention, showing the arms partly extended.
Figure 2:
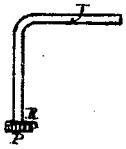
Figure 2 is an end view of one of the short arms, showing the position and operation of the stop.

A A represent the arms or clutches, which are formed from bars of iron of sufficient strength, and are pivoted together near their lower ends so as to form long and short arms, the ends of the long arms being so bent and shaped as to form hooks or clutches, as seen in fig. 1. Pivoted to the ends of the short arms of the clutches A, are the two short bars P P, which are pivoted together by means of the supporting-rod or elongated pivot J. One of the bars, P, is so constructed that its lower end forms a hook, D, for the purpose of sustaining the pulley. J is the pivoting-arm by means of which the lower ends of the two bars P P are joined together, and should be of just sufficient length to clear the pulley. This arm extends out horizontally from the clutches to a suitable distance, when the end is curved downwards, and thrust into a hole made in top of the pole B, on purpose to receive it. There should be a notch cut in the top of this pole, extending from the hole in the centre to its outer circumference, so as to receive the arm J, and prevent the clutches from swinging around while being adjusted. Attached to the inner end of the arm J is the stop R, for the purpose of counterbalancing the weight of the metal above the pivot. This stop consists of a plate or rod of metal, immovably attached to the pivot J, and which extends across the short bar P, and has its end bent down at right angles, (as seen in fig. 2,) thus forming a shoulder, so as to support the bar, and preventing the clutches from overbalancing the weight of the pulley. The hook D is so constructed that when the weight is supported by means of a pole, and the clutch stands open, the draught of pulley is in one direction only, thereby always being arrested by the stop. This stop is not intended to arrest the clutch until it swings sufficiently far to allow one arm to stand nearly vertical, when it is ready to catch over the top of a beam or other support.

The mode of operating my clutch is as follows: Take a pole of suitable strength and thickness, and bore a hole in the top, and chamfer from the hole to the outer edge, and cut a notch in one side. The vertical portion of the arm J is then thrust into this hole, the horizontal part resting in the notch, so as to prevent it from moving around. The pulley is then slipped over the hook D, (the whole arrangement assuming the position as shown in fig. 1,) when the clutch is raised by means of the pole until the vertical arm is caught over a rafter or other support, when the pole is removed, and the gravity of the pulley closes the clutch. By raising the pole until the weight is removed from the hook, the clutches open, when the point of support can be changed. According to the old method, it was necessary that some one should climb up to the rafter on which the pulley was attached every time that it became necessary to change its position, costing considerable labor, and always placing the operator in more or less danger. By the use of my clutch, all that labor and danger are both done away with.

Having thus described my invention, what I claim, and desire to secure by Letters Patent, is—

1. The combination of the pivoted bars P P, supporting-rod J, and stop R, with each other and with the short arms of the clutch A A, as a support for said clutch, and also to produce an automatic action, substantially as and for the purpose specified.

2. The hook $d$, in combination with the above, so arranged that when the clutch is supported by means of the rod J, the weight or draught at the hook $d$ will always swing the long arms of the clutch A A in one direction, which, when being arrested by the stop R, leaves one arm in a vertical position, so as to facilitate the process of changing the point of bearing which produces an automatic action, substantially in the manner specified.

Signed by me, this seventh day of September, 1867.

D. B. BAKER.

Witnesses:
 LES. L. HOLCOMB,
 J. H. BOWLUS.